United States Patent
Palm

(10) Patent No.: US 6,901,547 B2
(45) Date of Patent: May 31, 2005

(54) RETRANSMISSION PROCEDURE AND APPARATUS FOR HANDSHAKING PROTOCOL

(75) Inventor: Stephen Palm, Sunnyvale, CA (US)

(73) Assignee: Panasonic Communications Co., Ltd., Tokyo (JP)

(*) Notice: Subject to any disclaimer, the term of this patent is extended or adjusted under 35 U.S.C. 154(b) by 0 days.

(21) Appl. No.: 10/663,712

(22) Filed: Sep. 17, 2003

(65) Prior Publication Data

US 2004/0068686 A1 Apr. 8, 2004

Related U.S. Application Data

(63) Continuation of application No. 09/572,968, filed on May 18, 2000, now Pat. No. 6,694,470.
(60) Provisional application No. 60/135,308, filed on May 21, 1999, and provisional application No. 60/136,230, filed on May 26, 1999.

(51) Int. Cl.[7] .............................................. H04L 1/18
(52) U.S. Cl. ...................................... 714/748; 709/237
(58) Field of Search ................................ 370/462, 226, 370/394; 714/748, 749; 375/220; 455/462; 709/237

(56) References Cited

U.S. PATENT DOCUMENTS

| | | |
|---|---|---|
| 4,679,227 A | 7/1987 | Hughes-Hartogs |
| 4,680,773 A | 7/1987 | Amundson |
| 4,897,831 A | 1/1990 | Negi et al. |
| 4,949,338 A * | 8/1990 | Albal et al. ................. 370/462 |
| 4,953,210 A | 8/1990 | McGlynn et al. |
| 4,959,833 A * | 9/1990 | Mercola et al. ............. 714/748 |
| 5,144,651 A | 9/1992 | Cooper |
| 5,163,131 A | 11/1992 | Row et al. |
| 5,280,586 A | 1/1994 | Kunz et al. |

(Continued)

FOREIGN PATENT DOCUMENTS

| | | |
|---|---|---|
| CA | 2111543 | 6/1994 |
| CA | 2027230 | 4/1995 |
| EP | 0513527 | 11/1992 |
| EP | 0820168 | 1/1998 |
| EP | 0831624 | 3/1998 |
| EP | 0601260 | 5/1998 |
| EP | 0974202 | 1/2000 |
| WO | 97/49229 | 12/1997 |
| WO | 98/10545 | 3/1998 |
| WO | 99/35756 | 7/1999 |

OTHER PUBLICATIONS

ITU–T Recommendation V.8 bis ("Procedures for the Identification and Selection of Common Modes of Operation Between Data Circuit–Terminating Equipment (DCEs) and Between Data Terminal Equipments (DTEs) Over the General Switched Telephone Network and On Leased Point to–Point Telephone–Type Circuits"), which was published by the International Telecommunication Union in Aug., 1996.

(Continued)

*Primary Examiner*—David Ton
(74) *Attorney, Agent, or Firm*—Greenblum & Bernstein, P.L.C.

(57) ABSTRACT

Method and apparatus for minimizing a retransmission of messages when an error message is received during a communication handshaking procedure. A receiver, that detects an error message during the communication handshaking procedure, receives messages from a communication apparatus. When the receiver detects the error message, a retransmission requester transmits a retransmission request message to the communication apparatus.

30 Claims, 7 Drawing Sheets

U.S. PATENT DOCUMENTS

| | | |
|---|---|---|
| 5,311,578 A | 5/1994 | Bremer et al. |
| 5,321,722 A | 6/1994 | Ogawa |
| 5,349,635 A | 9/1994 | Scott |
| 5,371,534 A | 12/1994 | Dagdeviren et al. |
| 5,377,188 A | 12/1994 | Seki |
| 5,400,322 A | 3/1995 | Hunt et al. |
| 5,410,343 A | 4/1995 | Coddington et al. |
| 5,448,566 A | 9/1995 | Richter et al. |
| 5,463,382 A | 10/1995 | Nikas et al. |
| 5,463,661 A | 10/1995 | Moran, III et al. |
| 5,479,447 A | 12/1995 | Chow et al. |
| 5,491,720 A | 2/1996 | Davis et al. |
| 5,493,609 A | 2/1996 | Davis et al. |
| 5,550,848 A * | 8/1996 | Doshi et al. .............. 714/749 |
| 5,570,389 A * | 10/1996 | Rossi ..................... 375/220 |
| 5,592,536 A * | 1/1997 | Parkerson et al. ........ 455/462 |
| 5,608,764 A | 3/1997 | Sugita et al. |
| 5,633,890 A | 5/1997 | Ahmed |
| 5,644,573 A | 7/1997 | Bingham et al. |
| 5,668,857 A | 9/1997 | McHale |
| 5,682,419 A | 10/1997 | Grube et al. |
| 5,715,277 A | 2/1998 | Goodson et al. |
| 5,751,914 A | 5/1998 | Coley et al. |
| 5,757,803 A | 5/1998 | Russell et al. |
| 5,781,617 A | 7/1998 | McHale et al. |
| 5,796,808 A | 8/1998 | Scott et al. |
| 5,805,669 A | 9/1998 | Bingel et al. |
| 5,826,198 A | 10/1998 | Bergins et al. |
| 5,852,655 A | 12/1998 | McHale et al. |
| 5,903,608 A | 5/1999 | Chun |
| 5,910,970 A | 6/1999 | Lu |
| 5,912,921 A | 6/1999 | Warren et al. |
| 5,933,454 A | 8/1999 | Cioffi |
| 6,002,722 A | 12/1999 | Wu |
| 6,044,107 A | 3/2000 | Gatherer et al. |
| 6,055,268 A | 4/2000 | Timm et al. |
| 6,064,693 A | 5/2000 | Oliver et al. |
| 6,141,354 A | 10/2000 | Nakatsugawa |
| 6,205,208 B1 | 3/2001 | Detlefsen et al. |
| 6,272,108 B1 * | 8/2001 | Chapman ................ 370/226 |
| 6,335,933 B1 * | 1/2002 | Mallory .................. 370/394 |
| 6,735,245 B1 | 5/2004 | Palm |

OTHER PUBLICATIONS

An Article by K. Krechmer at pp. 63, 64 and 66 of Data Communications, McGraw Hill, NY, vol. 23, No. 2 (Jan. 21, 1994), entitled "V.34 Modems: Off to a Fast Start?.".

An article by F. Mescam, entitled "Introduction A La Procedure De Transmission HDLC", published at pp. 69–73 of L 'Onde Electrique, vol. 53, No. 2 (Feb., 1973).

An article by H. Ohba et al., entitled "End–to–End Protocol Based on CCITT X.25 and Its Implementation", published at pp. 281–287 of Evolutions in Computer Communications, Kyoto Sep. 26–29, 1978, International Conference On Computer Communication, Tokyo, Japan, vol. CONF. 4, Sep. 1978.

An article published in the periodical, "Nikkei Communications", vol. 252, Aug. 18, 1997, pp. 80–89.

ITU–T recommendation G.994.1 ("Handshake Procedures For Digital Subscriber Line (DSL) Transceivers"), published by the International Telecommunication Union in Feb., 2001.

* cited by examiner

RETRANSMISSION PROCEDURE AND APPARATUS FOR HANDSHAKING PROTOCOL

This is a continuation of U.S. application Ser. No. 09/572,968, filed on May 18, 2000, now U.S. Pat. No. 6,694,470, which claims the priority under 35 U.S.C. § 119 of U.S. Provisional Application Nos. 60/135,308, filed on May 21, 1999, and 60/136,230, filed on May 26, 1999, the disclosures of which are expressly incorporated by reference herein in their entirety.

BACKGROUND OF THE INVENTION

Definitions

The following definitions are employed throughout the following discussion:

carrier set—a set of one or more frequencies associated with a PSD mask of a particular xDSL Recommendation;

downstream—direction of transmission from the xTU-C to the xTU-R;

Galf—an octet having the value $81_{16}$; i.e., the ones complement of an HDLC flag;

initiating signal—signal which initiates a startup procedure;

initiating station—DTE, DCE and other associated terminal equipment which initiates a startup procedure;

message—framed information conveyed via modulated transmission;

metallic local loop—communication channel 5, the metallic wires that form the local loop to the customer premise;

responding signal—signal sent in response to an initiating signal;

responding station—station that responds to initiation of a communication transaction from the remote station;

session—active communications connection, measured from beginning to end, between computers or applications over a network;

signal—information conveyed via tone based transmission;

signaling family—group of carrier sets which are integral multiples of a given carrier spacing frequency;

splitter—combination of a high pass filter and a low pass filter designed to split a metallic local loop into two bands of operation;

transaction—sequence of messages, ending with either a positive acknowledgment [ACK(1)], a negative acknowledgment (NAK), or a time-out;

terminal—station; and upstream: The direction of transmission from the xTU-R to the xTU-C.

Abbreviations

The following abbreviations are used throughout the following discussion:

ACK—Acknowledge Message;
ADSL—Asymmetric Digital Subscriber Line;
CDSL—Consumer Digital Subscriber Line;
DSL—Digital Subscriber Line;
FSK—Frequency Shift Keying;
HDSL—High bit rate Digital Subscriber Line;
HSTU-C—handshaking portion of the xDSL central terminal unit (xTU-C);
HSTU-R—handshaking portion of the xDSL remote terminal unit (xTU-R).

ITU-T—International Telecommunication Union—Telecommunication Standardization Sector;
NAK—Negative Acknowledge Message;
POTS—Plain Old Telephone Service
PSD—Power Spectral Density;
PSTN—Public Switched Telephone Network;
RADSL—Rate Adaptive DSL;
RTX—Request Retransmit;
VDSL—Very high speed Digital Subscriber Line;
xDSL—any of the various types of Digital Subscriber Lines (DSL);
xTU-C—central terminal unit of an xDSL; and
xTU-R—remote terminal unit of an xDSL.

1. Field of the Invention

The present invention is directed to a high speed communications device, such as, for example, but not limited to, a modem, a cable modem, an xDSL modem, a satellite communication system, a point-to-point wired, or a wireless communication system, that includes a handshaking or initializing protocol, and in particular, to an apparatus and method that provides error free communication by detecting errors and requesting the retransmission of errored communication messages.

2. Discussion of Background and Other Information

Recently, new communication methods are being proposed and/or developed to transmit data on a local twisted wire pair that uses a frequency spectrum above a traditional voice band (e.g., 4 kHz bandwidth). For example, various "flavors" (variations) of digital subscriber line (DSL) modems have been/are being developed, such as, but not limited to, for example, DSL, ADSL, VDSL, HDSL, SHDSL and SDSL (the collection of which is generally referred to as xDSL). Each particular xDSL technology requires a robust start-up or initialization technique.

The ITU-T has published several recommended procedures for initiating a data communication, the following subject matter of which is expressly incorporated herein by reference in their entireties:

1) Recommendation V.8, entitled "Procedures For Starting Sessions Of Data Transmission Over The General Switched Telephone Network", published in September, 1994;

2) Recommendation V.8bis, entitled "Procedures For The Identification And Selection Of Common Modes Of Operation Between Data Circuit-Terminating Equipments (DCEs) And Between Data Terminal Equipments (DTEs) Over The General Switched Telephone Network", published in August, 1996; and 3) Recommendation G.994.1, entitled "Handshake Procedures For Digital Subscriber Line (DSL) Transceivers", published in June 1999. It is noted that this document is the final version of Temporary Document MA-006, that was published in March, 1999.

Documents (1) and (2), above, pertain to procedures for initiating a data communication over voice band channels. Document (3), above, pertains to initiating a data communication over xDSL channels.

Unfortunately, if a data reception error occurs in a message, even if the error is only a single bit in length, the data communication devices must completely restart, from the beginning, a handshake (initialization) procedure. Since initialization procedures often involve a plurality of messages or transactions, and thus, restarting a transmission from the beginning results in a significant loss of information and time. Thus, there is a need for an apparatus and method that minimizes an initialization recovery procedure, by retransmitting only the errored portion of a session instead of completely restarting the initialization procedure.

SUMMARY OF THE INVENTION

Accordingly, an object of the present invention is to develop a retransmission mechanism that retransmits an errored message that occurs during handshaking or initializing procedure. In a disclosed embodiment, the procedure is implemented as an extension to an xDSL handshaking and selection procedure (such as, but not limited to, for example, the above-noted ITU-T Recommendations G.994.1, V.8, and V.8bis). According to the instant invention, if a communication device receives an errored message during a session, the communication device indicates the last correctly received message and requests a retransmission of the errored message. In addition, an optional feature of the present invention enables the retransmission request messages to suggest the length of a message frame to be used by a communication device in order to help reduce the occurrence of frames with errors.

According to an object of the invention, a communication device is disclosed that minimizes a retransmission of signals and messages when an errored message is received during a communication handshaking procedure. The communication device has a receiving section that receives signals from an initiating communication device, in order to detect when an errored message is received, and a retransmission request device that transmits, to the initiating communication device, a retransmission request message indicating that the errored message was received. The receiving section includes an error detecting device that operates to detect errored messages.

According to a feature of the invention, the retransmission request message may indicate which correct message was lastly received by the communication device. In addition, the retransmission request message can include information related to, for example, a suggested length of subsequent message frames to be transmitted, or a frame number of a multi-segmented message.

According to another object of the current invention, a method is disclosed for minimizing a retransmission of signals and messages when an errored message is received during a handshaking procedure of a communication session. According to this method, the handshaking procedure is monitored to determine whether a received signal contains an errored message. When the monitored handshake procedure determines that an errored message was received, a retransmission request message is transmitted to request retransmission of a portion of the handshaking procedure.

According to an advantage of the invention, data related to a Frame Check Sequence is examined to determine whether an errored message was received.

According to another advantage of the invention, the retransmission request message may, for example, indicate a last correctly received message, or, indicate a segment index number of a multi-segment message, or, record the type (or length) of the received message. In addition, a specific message type from a predetermined set of message types of the last correctly received message may be encoded with the retransmission request message.

According to a feature of the invention, the retransmission request message may indicate a suggested frame length of subsequently transmitted signals, which may be based, for example, on a frame length of a last correctly received message.

According to another feature of the invention, the communication session may be terminated when a predetermined number of errored messages (such as, for example, three) occur.

Another object of the invention concerns a method for minimizing a retransmission of signals and messages when an errored message is received during a handshaking procedure of a communication session, by monitoring received data related to a predetermined frame structure of a high speed handshaking procedure (such as, for example, data related to a Frame Check Sequence of an xDSL handshaking procedure), and transmitting a retransmission request message when the monitored predetermined frame structure indicates that the received data includes an errored message. In addition, the communication session can be terminated when a predetermined number of errored messages, such as, for example, three errored messages, are transmitted.

A still further object of the invention pertains to a method for minimizing a retransmission of signals and messages when an errored message is received during an xDSL negotiation procedure of a communication session. Received data related to a Frame Check Sequence is monitored. If the Frame Check Sequence indicates that the received data includes an errored message, a retransmission request message is transmitted. This message includes information identifying which correct message was lastly received. However, should a predetermined number of errored messages, such as three, occur, the communication session is terminated. In addition, the retransmission request message my contain information suggesting a frame length of subsequently transmitted signals. The suggested frame length may be based upon a frame length of the correct message that was lastly received.

BRIEF DESCRIPTION OF THE DRAWINGS

The foregoing and other objects, features and advantages of the invention will be apparent from the following more particular description of preferred embodiments, as illustrated in the accompanying drawings which are presented as a non-limiting example, in which reference characters refer to the same parts throughout the various views, and wherein.

DETAILED DESCRIPTION OF PREFERRED EMBODIMENTS

A preferred embodiment of the present invention is described below in the context of a new message type, procedure, and associated transaction to an startup mechanism, such as, but not limited to, for example, an xDSL startup method defined in ITU-T Recommendation G.994.1. This new message type will be referred to hereinafter as a "Request Retransmit" (RTX).

The particulars shown herein are by way of example, and for purposes of illustrative discussion of embodiments of the present invention only, and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the present invention may be embodied in practice.

According to the current invention, if a communication device receives an errored message during a session (e.g., meaning a message containing at least 1 bit that is erroneous), the communication device requests a retransmission (RTX) of the errored message and indicates the last correctly received message to the communication device that transmitted the message. The RTX message may optionally suggest the length of a message frame to be used by the communication device transmitting messages in order to help reduce the future occurrence of frames containing errors in the data transmission.

While the present invention is presented herein with respect to ITU-T Recommendation G.994.1, it is noted that the functionality and methodology of using the RTX message and procedure is applicable to other handshake procedures, such as, but not limited to, the aforementioned ITU-T Recommendations V.8 and V.8bis, without departing from the spirit and/or scope of the invention.

Figure 1:
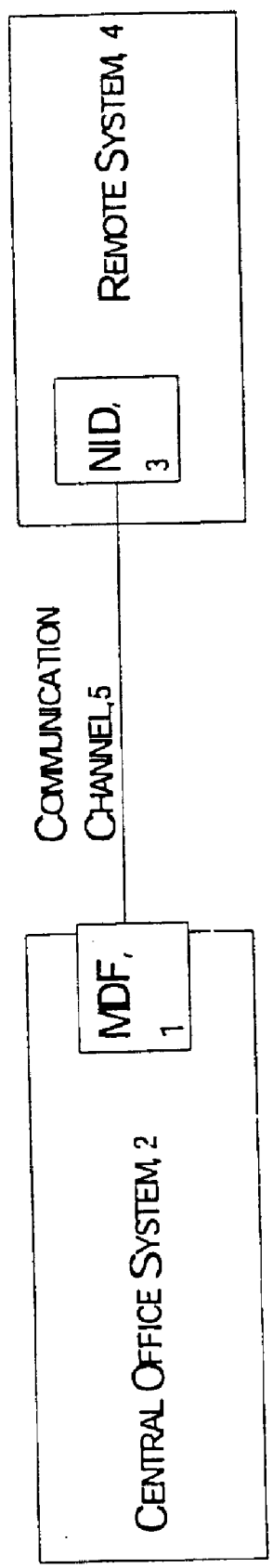
FIG. 1 illustrates a block diagram of a data communication system using a modem device according to an embodiment of the present invention.

FIG. 1 illustrates an example of an data communication system that implements the details of the handshake procedure of the present invention. As shown in FIG. 1, the data communication system comprises a central office system 2 and a remote system 4, which are interfaced together via a communication channel 5.

The central office system 2 includes a main distribution frame (MDF) 1 that functions to interface the central office system 2 to the communication channel 5. The main distribution frame (MDF) 1 operates to, connect, for example, telephone lines (e.g., communication channel 5) coming from the outside, on one side, and internal lines (e.g., internal central office lines) on the other side.

The remote system 4 includes a network interface device (NID) 3 that functions to interface the remote system 4 to the communication channel 5. The network interface device (NID) 3 interfaces the customer's equipment to the communications network (e.g., communication channel 5).

It is understood that the present invention may be applied to other communications devices without departing from the spirit and/or scope of the invention. Further, while the present invention is described with reference to a telephone communication system employing twisted pair wires, it is understood that the invention is applicable to other transmission environments, such as, but not limited to, cable communication systems (e.g., cable modems), optical communication systems, wireless systems, infrared communication systems, etc., without departing from the spirit and/or scope of the invention.

Figure 2:
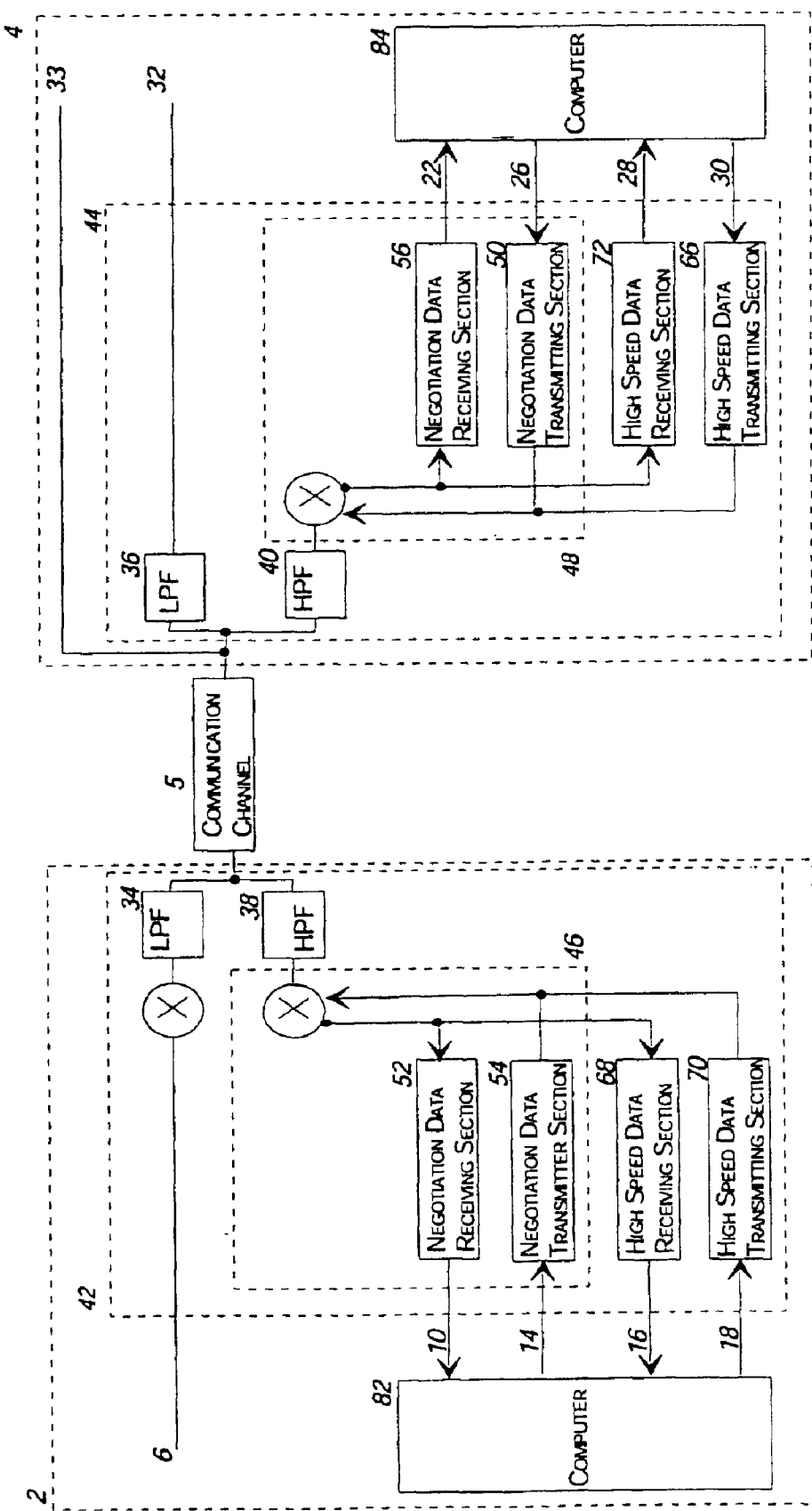
FIG. 2 illustrates a detailed block diagram of a data communication system of FIG. 1.

FIG. 2 illustrates a detailed block diagram of a first embodiment of the data communication system of FIG. 1. This embodiment represents a typical installation, in which both the central office system 2 and the remote system 4 implement the instant invention.

As shown in FIG. 2, the central office system 2 comprises a low pass filter 34 and a high pass filter 38, a test negotiation block 46, a high speed data receiving section 68, a high speed data transmitting section 70, and a computer 82. Computer 82 is understood to be a generic interface to network equipment located at the central office. Test negotiation block 46 performs all of the negotiation and examination procedures which takes place prior to the initiation of an actual high speed data communication.

The low pass filter 34 and high pass filter 38 function to filter communication signals transferred over the communication channel 5. The test negotiation block 46 tests and negotiates conditions, capacities, etc. of the central office system 2, the remote system 4, and the communication channel 5. The procedures of the test negotiation block 46 are completed prior to, and initiate the selection of the high speed modem receiving and transmitting sections (e.g., modems) 68 and 70. The high speed receiving section 68 functions to receive high speed data transmitted from the remote system 4, while the high speed data transmitting section 70 transmits high speed data to the remote system 4. The high speed sections 68 and 70 may comprise, but not be limited to, for example, ADSL, HDSL, SHDSL, VDSL, CDSL modems. High speed sections 68 and 70 can be a plurality of high speed transmission devices which "share" the common block 46 during the initial negotiation procedure. The negotiation data receiving section 52 and the high speed data receiving section 68 transmit signals to computer 82. The negotiation data transmitting section 54 and the high speed data transmitting section 70 receive signals issued from the computer 82.

In the disclosed embodiment, test negotiation block 46 comprises a negotiation data receiving section (e.g., a receiving section) 52 and a negotiation data transmitting section (e.g., retransmission request device) 54. The negotiation data receiving section 52 receives negotiation data, while the negotiation data transmitting section 54 transmits negotiation data. The operation of the various sections of the central office system 2 will be described, in detail, below.

Remote system 4 comprises a low pass filter 36, a high pass filter 40, a test negotiation block 48, a high speed data receiving section 72, a high speed data transmitting section 66, and a computer 84. Computer 84 is understood to be a generic interface to network equipment located at the remote system. Test negotiation block 48 performs all of the negotiation and examination procedures that take place prior to the actual high speed data communication.

The low pass filter 36 and high pass filter 40 operate to filter communication signals transferred over the communication channel 5. The test negotiation block 48 tests and negotiates conditions, capacities, etc. of the central office system 2, the remote system 4, and the communication channel 5. The high speed receiving section 72 functions to receive high speed data transmitted from the central office system 2, while the high speed data transmitting section 66 transmits high speed data to the central office system 2. The negotiation data receiving section 56 and the high speed data receiving section 72 transmit signals to the computer 84. The negotiation data transmitting section 50 and the high speed data transmitting section 66 receive signals issued from the computer 84.

In the disclosed embodiment, the test negotiation block 48 comprises a negotiation data receiving section 56 and a negotiation data transmitting section 50. The negotiation data receiving section 56 receives negotiation data, while the negotiation data transmitting section 50 transmits negotiation data. The operation of the various sections of the remote system 4 will be described, in detail, below.

The negotiation data transmitting section 50 of the remote system 4 transmits the upstream negotiation data to the negotiation data receiving section 52 of the central system 2. The negotiating data transmitting section 54 of the central system 2 transmits the downstream negotiating data to the negotiation data receiving section 56 of the remote system 4.

The central office system 2 includes a plurality of channels 6, 10, 14, 16 and 18 that are used to communicate with a plurality of channels 22, 26, 28, 30 and 32 of the remote system 4. In this regard, it is noted that in the disclosed embodiment, channel 6 comprises a central voice channel that is used to directly communicate with a corresponding remote voice channel 32 in a conventional voice band (e.g., 0 Hz to approximately 4 kHz), which has been filtered by low pass filters 34 and 36. Further, a remote voice channel 33 is provided in the remote system 4 that is not under the control of the central office system 2. Remote voice channel 33 is connected in parallel with the communication channel 5 (but prior to the low pass filter 36), and thus, provides the same service as the remote voice channel 32. However, since this channel is connected prior to the low pass filter 36, the remote voice channel 33 contains both the high speed data signal and a voice signal.

It is noted that the filters may be arranged to have different frequency characteristics, so that a communication may take place using other, low band communication methods, such as, for example, ISDN, between voice channels 6 and 32. The high pass filters 38 and 40 are selected to ensure a frequency spectrum above 4 kHz. It is noted that some systems do not require, nor implement, some (or all) of the filters 34, 36, 38, and 40.

Bit streams 10, 14, 16 and 18 (in the central office system 2) and bit streams 22, 26, 28 and 30 (in the remote system 4) comprise digital bit streams that are used to communicate between the central computer 82 and the remote computer 84, respectively. It is understood that it is within the scope of the present invention that bit streams 10, 14, 16, and 18 could be implemented as discrete signals (as shown), or bundled into an interface, or cable, or multiplexed into a single stream, without changing the scope and/or function of the instant invention. For example, bit streams 10, 14, 16 and 18 may be configured as (but are not limited to) an interface conforming to a RS-232, parallel, FireWire (IEEE-1394), Universal Serial Bus (USB), wireless, or infrared (IrDA) standard. Likewise, it is understood that bit streams 22, 26, 28 and 30 can be implemented as discrete signals (as shown in the drawings), or bundled into an interface, or cable, or multiplexed into a single stream, as described above.

Negotiation data (e.g., control information) corresponding to the condition of the communication line (e.g., frequency characteristics, noise characteristics, presence or absence of a splitter, etc.), capabilities of the equipment, and user and application service requirements is exchanged between the negotiation data receiving section 52 and negotiation data transmitting section 54 of the central office system 2, and the negotiation data receiving section 56 and negotiation data transmitting section 50 of the remote system 4.

The essential features of the hardware portion of the invention is the functionality contained in the test negotiation blocks 46 and 48, which test and negotiate the conditions, capabilities, etc. of the central office system 2, the remote system 4, and the communication channel 5. In practice, the configuration of the central office system 2 and the remote system 4 is subject to wide variations. For example, the configuration of the external voice channel 33 is not under the control of the same entities that control the central office system 2. Likewise, the capabilities and configuration of the communication channel 5 are also subject to wide variation. In the disclosed embodiment, test negotiation blocks 46 and 48 are embedded within modems 42 and 44. However, the functionality of test negotiation blocks 46 and 48 may, alternatively, be implemented separate and distinct from the modems 42 and 44. Signals transmitted and received between the test negotiation blocks 46 and 48 are used for testing the environment itself as well as communicating the results of the tests between the central office system 2 and the remote system 4.

The purpose of each signal path in FIG. 2 will be explained below, followed by an explanation of the devices used to create the signals. Examples of specific values for the various frequencies will be discussed in detail, below.

In the disclosed embodiment, frequency division multiplexing (FDM) is utilized for various communication paths to exchange information between the central office system 2 and the remote system 4. However, it is understood that other techniques (such as, but not limited to, for example, CDMA, TDMA, spread spectrum, etc.) may be used without departing from the spirit and/or scope of the present invention.

The range from frequency 0 Hz until frequency 4 kHz is typically referred to as the PSTN voice band. Some of the newer communication methods typically attempt to use the frequency spectrum above 4 kHz for data communication. Typically, the first frequency where transmission power is allowed occurs at approximately 25 kHz. However, any frequency may be used. In this regard, it is noted that tone bursts at a frequency of 34.5 kHz are used to initiate T1E1 T1.413 ADSL modems. As a result, if possible, that frequency should be avoided in the spectrum used by precursor negotiation methods.

Communication paths are defined in pairs, one path for an upstream communication from the remote system 4 to the central office system 2, and another path for a downstream communication from the central office system 2 to the remote system 4. The negotiation upstream bits are transmitted by the negotiation data transmitting section 50 of the remote system 4, and received by the negotiation data receiving section 52 of the central office system 2. The negotiation downstream bits are transmitted by the negotiation data transmitting section 54 of the central office system 2, and received by the negotiation data receiving section 56 of the remote system 4. Once the negotiation and high speed training has been completed, the central office system 2 and the remote system 4 use high speed data transmitting sections 66 and 70, and high speed data receiving sections 72 and 68 to perform a duplex communication.

All messages in the present invention are sent with one or more carriers, using, for example, a Differential (Binary) Phase Shift Keying (DPSK) modulation. The transmit point is rotated 180 degrees from the previous point if the transmit bit is a 1, and the transmit point is rotated 0 degrees from the previous point if the transmit bit is a 0. Each message is preceded by a point at an arbitrary carrier phase. The frequencies of the carriers, and the procedures for starting the modulation of carriers and messages, will be described below.

The present invention goes to great lengths, both before the handshake procedure is performed and during the handshake procedure, to be spectrally polite or as non-obtrusive as possible. Carriers are typically selected so as to be different for the upstream and downstream paths, avoid existing system activation tones, be reasonably robust against inter-modulation products, have sufficient spacing, etc. Some suitable sets of carrier tones using 4.3125 kHz and 4.0 kHz base frequencies, are shown in Table 1, below:

TABLE 1

| Signal Designation | Upstream Frequency Indices (N) | Downstream Frequency Indices (N) |
|---|---|---|
| A43 | 9 17 25 | 40 56 64 |
| B43 | 37 45 53 | 72 88 96 |
| C43 | 7 9 | 12 14 64 |
| A4 | 3 | 5 |
| B4 | 4 28 34 | 66 67 76 |

After the remote system 4 analyzes the equipment capabilities, the application desires, and the channel limitations, it makes a final decision on the communication method to use.

After the central office system 2 has received the final decision, the transmission of the negotiation downstream data is stopped. When the remote system 4 detects the loss of energy (carrier) from the central office system 2, the remote system 4 stops transmitting the negotiation upstream data. After a short delay, the negotiated communication method begins it's initialization procedures.

When initiating a high speed communication session, one of the central office or remote systems transmits signals that are received by the opposite system, which responds by transmitting predetermined signals, such as, for example, signals required in a handshake session. These signals compromise one of a half duplex or full duplex start-up procedure. An example of such a start-up procedure is described in, for example, U.S. application Ser. No. 09/473,683, filed on Dec. 29, 1999, the disclosure of which is expressly incorporated by reference herein in its entirety. However, it is understood that alternative start-up procedures may be employed without departing from the spirit and/or scope of the current invention. The start-up procedure establishes a bi-directional communication channel for use by a handshake session. Other examples of handshake sessions include, but are not limited to, ITU-T Recommendations V.8, V.8bis, and G.994.1 (formerly referred to as G.hs).

After the handshake session has been initiated, and before it is terminated, one or more transactions are used to exchange data between the xTU-C and the xTU-R. Each transaction comprises at least one message that contains data and/or requests, and then concludes with an acknowledgment message (or a negative-acknowledgment message).

The data includes, but is not limited to, for example: equipment capabilities, channel capabilities, available modes of operation, user requests, application requests, and service requests. Requests may include, but are not limited to, for example: a requested mode of operation, a requested data rate, and a requested protocol. The unit responding to a message indicates an acceptance (with an acknowledgment message), a rejection (with a negative acknowledgment message), or a desire to initiate a different type of message with a request message. Depending on the response, a unit may initiate another transaction or terminate the handshake session. An acknowledgment to a mode selection message will cause the handshake session to be terminated, and the communication mode selected in the mode selection message to be initiated, using known techniques.

In the discussion of the invention to follow, messages use the frame structure set forth in ITU-T Recommendation G.994.1, noted above, as shown below in Table 2. It is noted that the two Frame Check Sequence (FCS) octets are used to determine if a message is received in error. However, it is understood that alternative frame structures can be employed without departing from the spirit and/or scope of the invention.

TABLE 2

| Frame Structure | |
|---|---|
| Flag | Octet 1 |
| Flag | 2 |
| Flag (optional) | |
| Flag (optional) | |
| Flag (optional) | |
| Information Field | |
| FCS (first octet) | N - 2 |
| FCS (second octet) | N - 1 |
| Flag | N |
| Flag (optional) | |
| Flag (optional) | |

The overall composition of the Information Field (shown in Table 2) of the messages is shown in Table 3, below, including the RTX message of the present invention.

TABLE 3

| | Overall Message Composition | | | | |
|---|---|---|---|---|---|
| | Identification | | | Standard Information | Non Standard Information |
| Messages | Message Type & Revision (2 octets) | Vendor ID (8 octets) | Service & Channel parameters | Modulations & Protocols available | $1 + \sum_{i=1}^{N} (7 + M_i)$ octets |
| MR | X | — | — | — | — |
| CLR | X | X | X | X | as necessary |
| CL | X | X | X | X | as necessary |
| MS | X | — | X | X | as necessary |
| ACK | X | — | — | — | — |
| NAK | X | — | — | — | — |

TABLE 3-continued

Overall Message Composition

| Messages | Identification | | | Standard Information | Non Standard Information |
| --- | --- | --- | --- | --- | --- |
| | Message Type & Revision (2 octets) | Vendor ID (8 octets) | Service & Channel parameters | Modulations & Protocols available | $1 + \sum_{i=1}^{N}(7 + M_i)$ octets |
| REQ | X | — | — | — | — |
| RTX | X | — | X | — | — |

Table 4 lists typical message types defined in ITU-T Recommendation G.994.1 and also adds support for the new RTX message of the present invention. Table 5 illustrates the manner in which a revision number is encoded. The revision number is examined to determine whether the RTX message type is supported. Specifically, if the revision number is set to 1 or below, the message extension (of the present invention) to ITU-T Recommendation G.994.1 is not supported, and thus, if an errored message is received, prior art error recovery techniques (e.g., transmission of a NAK-EF message followed a by session clear down and complete restarting) must be utilized. To utilize the RTX message and its improved retransmission scheme of the current invention, the revision number must be greater than 1.

TABLE 4

Message type field format

| | Bit Numbers | | | | | | | |
| --- | --- | --- | --- | --- | --- | --- | --- | --- |
| Message type | 8 | 7 | 6 | 5 | 4 | 3 | 2 | 1 |
| MS | 0 | 0 | 0 | 0 | 0 | 0 | 0 | 0 |
| MR | 0 | 0 | 0 | 0 | 0 | 0 | 0 | 1 |
| CL | 0 | 0 | 0 | 0 | 0 | 0 | 1 | 0 |
| CLR | 0 | 0 | 0 | 0 | 0 | 0 | 1 | 1 |
| ACK(1) | 0 | 0 | 0 | 1 | 0 | 0 | 0 | 0 |
| ACK(2) | 0 | 0 | 0 | 1 | 0 | 0 | 0 | 1 |
| NAK-EF | 0 | 0 | 1 | 0 | 0 | 0 | 0 | 0 |
| NAK-NR | 0 | 0 | 1 | 0 | 0 | 0 | 0 | 1 |
| NAK-NS | 0 | 0 | 1 | 0 | 0 | 0 | 1 | 0 |
| NAK-NU | 0 | 0 | 1 | 0 | 0 | 0 | 1 | 1 |
| REQ-MS | 0 | 0 | 1 | 1 | 0 | 1 | 0 | 0 |
| REQ-MR | 0 | 0 | 1 | 1 | 0 | 1 | 0 | 1 |
| REQ-CLR | 0 | 0 | 1 | 1 | 0 | 1 | 1 | 1 |
| RTX | 0 | 1 | 0 | 0 | 0 | 0 | 0 | 0 |

TABLE 5

Revision Number field format

| | Bit numbers | | | | | | | |
| --- | --- | --- | --- | --- | --- | --- | --- | --- |
| Revision number | 8 | 7 | 6 | 5 | 4 | 3 | 2 | 1 |
| Revision 1 | 0 | 0 | 0 | 0 | 0 | 0 | 0 | 1 |
| Revision 2 | 0 | 0 | 0 | 0 | 0 | 0 | 1 | 0 |

The RTX message has the format shown in Table 6, below.

TABLE 6

RTX Frame Format

| Octet Content | Octet Index # |
| --- | --- |
| Leading Flags | |
| Message type (RTX) | 1 |
| Revision Number | 2 |
| Last Correctly Received Message (LCRM) | 3 |
| Multi-Segment Frame Number (MSFN) | 4 |
| Suggested Frame Size (SFS) | 5 |
| Frame Check Sequence (FCS) (2 octets) | 6 |
| | 7 |
| Trailing Flags | |

A description of each octet shown in Table 6, above, will now be described.

The Message Type octet contains the unique number of the RTX message type as described in Table 4.

The Revision Number octet indicates a version number of the transaction protocol that is being transmitted. This octet must be set greater than one (1) in order to indicate that this is a new message type. Table 5, above, illustrates encoding values.

The Last Correctly Received Message (LCRM) octet contains the Message Type code of the last correctly received message. In the disclosed embodiment, a NULL message code ($FF_{16}$) is used for the LCRM octet when an error free message has not been received in the session. However, alternative message codes can be used without departing from the scope and/or spirit of the invention.

The Multi-Segment Frame Number (MSFN) octet contains a segment index number of a message that has been segmented into a plurality of frames. A first segment (or a message contained in one frame) has a MSFN value of 0. A second segment contained in the frame has a MSFN value of 1, and so on. Although segment frames are not explicitly numbered, the HSTU-R and HSTU-C communication devices each maintain internal counters that implicitly keep track of the MSFN value.

The Suggested Frame Size (SFS) octet contains a value suggesting to the other side (e.g. the remote system 4 when the RTX message containing the SFS octet is transmitted by the central office 2, or the central office system 2 when the RTX message containing the SFS octet is transmitted by the remote system 4) the length of subsequent message frames to be transmitted by the other side. Values for this octet are encoded as:

FF$_{16}$—Reserved for Future Use
00$_{16}$—No change of frame size suggested
00xx xxxx$_2$—Size of frame It is understood that these values above are presented as an example implemented by the embodiment of the current invention. However, it is understood that such values are presented merely as an example, and changes to the values may be made without departing from the spirit and/or scope of the invention.

Figure 3:
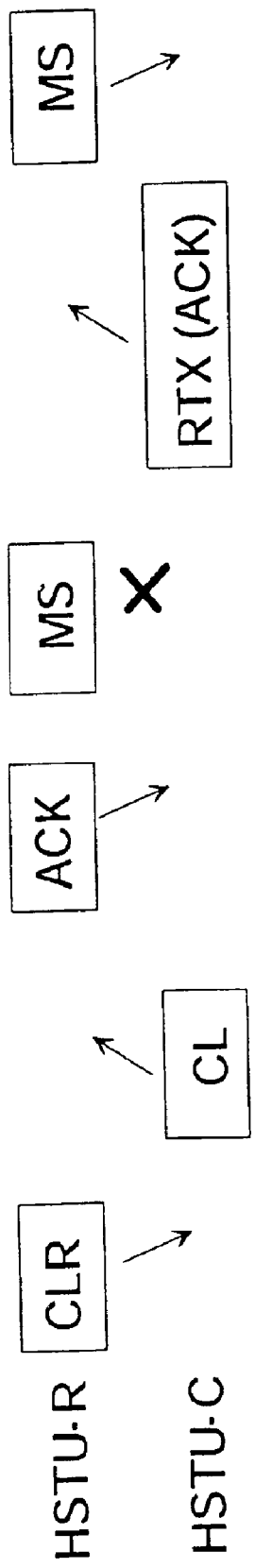
FIG. 3 illustrates an example transaction where a message from a HSTU-R contains an error.
Figure 4:
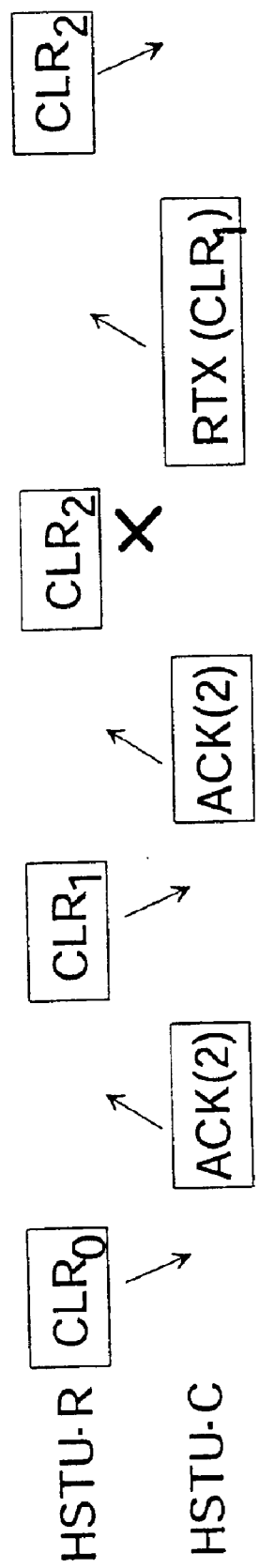
FIG. 4 illustrates an example transaction in which one frame of a multi-segment message contains an error.
Figure 5:
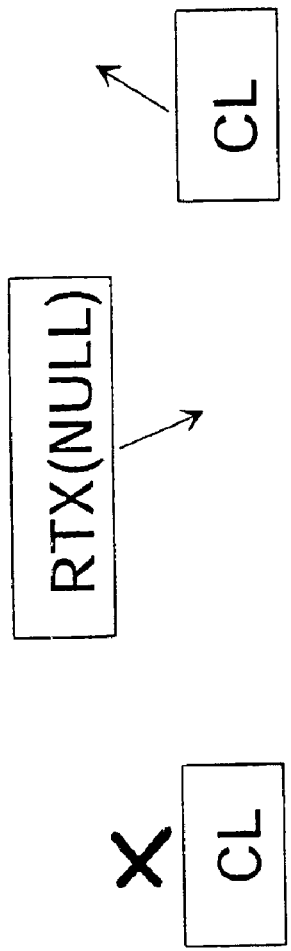
FIG. 5 illustrates an example transaction where a message from a HSTU-C contains an error.
Figure 6:
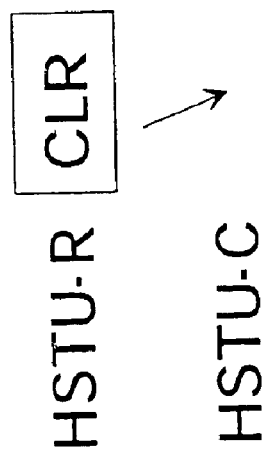
FIG. 6 illustrates an example of a typical transaction in which multiple errors occur.
Figure 6:
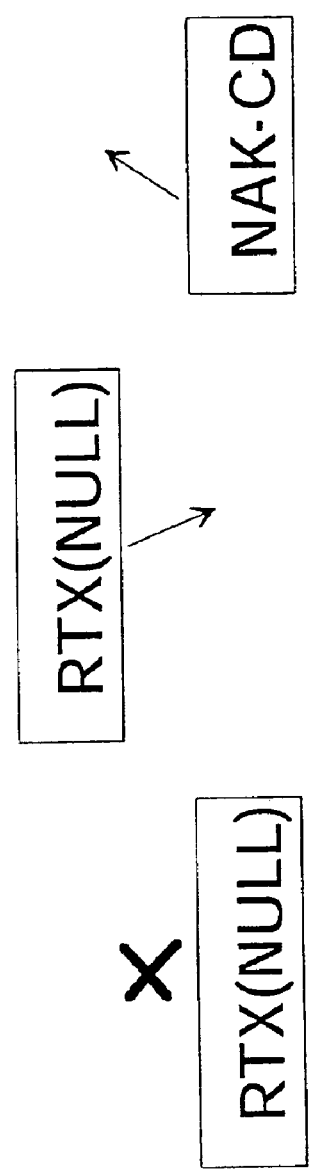

In the disclosed embodiment, handshake transactions (to initiate a data communication) that include the RTX message must adhere to the following four minimum rules:

(1) If a HSTU-x receives an errored message, the HSTU-x transmits (sends) an RTX message. The Last Correctly Received Message (LCRM) field contains the type of the last correctly received message. The Multi-Segment Frame Number (MSFN) octet and the Suggested Frame Size (SFS) octet are encoded in the manner described above. An example transaction is illustrated in FIG. 3, and will be described below;

(2) If a HSTU-x receives an errored multi-segmented message, the Multi-Segment Frame Number (MSFN) field contains the message segment number. As previously described above, in the disclosed embodiment, the first segment has a MSFN value of 0. The second segment has a MSFN value of 1, and so on. Although the segment frames do not contain a field which explicitly numbers the frame, the HSTU-R (e.g., remote system 4) and the HSTU-C (e.g., central system 2) must maintain an implicit count of the number of frames that are received. An example transaction is illustrated in FIG. 4, and will be described below;

(3) If a HSTU-x has not received an error free message during the handshaking session, the Last Correctly Received Message (LCRM) octet must contain the NULL message code. An example of such a session is illustrated in FIG. 5, and will be described below; and (4) If a HSTU-C receives an RTX message with the Last Correctly Received Message (LCRM) set to NULL, the HSTU-C must respond with a NAK-CD message to clear down (e.g., hangup/terminate) the session. An example of such a session is illustrated in FIG. 6, and will be described below.

Two additional rules are contained in the disclosed preferred embodiment. They are:

(1) If a HSTU-x receives three successive RTX messages, the HSTU-x must send a NAK-CD message to clear down (e.g., hangup/terminate) the session; and (2) An RTX message is not "acknowledged". Thus, the transaction proceeds as if the errored message and the RTX message were not sent.

With respect to the examples session shown in FIGS. 3 to 12, it is noted that an arrow indicates a successfully received message, while an "X" indicates a received message that is errored.

It is noted that a HSTU-X does not have to retransmit exactly the same sequence of bits it transmitted in a message before receiving the RTX message. Since the errored message type cannot be positively known, the receiving HSTU-X should not make any assumptions about the contents of the errored frame. When the transmitting HSTU-X has been notified of an RTX, it can decide to shorten the message length in accordance with the Suggested Frame Size (SFS) octet. Additionally, the transmitting HSTU-X may decide to change the contents (or the message type), knowing that the communication channel is likely to have future errors.

The above discussion was presented with an embodiment in which the first message is always sent by the HSTU-R. However, the instant invention is equally applicable in the situation in which the first message is transmitted by the HSTU-C. Accordingly, it is understood that the first message can be transmitted by the HSTU-C without departing from the spirit and/or scope of the invention.

An explanation of the use of the invention will now be presented with reference to FIGS. 3 to 12. In this regard, it is understood that the following examples are provided merely for illustrative discussion, and are not to limit the scope of the invention.

In the example illustrated in FIG. 3, the HSTU-C successfully receives a CLR message transmitted by the HSTU-R. The HSTU-R then receives a CL message from the HSTU-C. Thereafter, the HSTU-R sends an ACK message and then, a MS message to the HSTU-R. Although the HSTU-R sent the MS message to the HSTU-C, the HSTU-C does not receive the message error free. Since the last correctly received message from the HSTU-R was an ACK message, the HSTU-C prepares an RTX message with the LCRM field set to the code of the ACK message. When the HSTU-R receives the RTX message, it determines that the ACK message was correctly received but that the data thereafter (e.g., the MS message) was not correctly received. As a result, the HSTU-R retransmits the MS message. Although not shown in the FIG. 3, the transaction then continues using standard transaction rules.

FIG. 4 illustrates the sending of a multi-segment CLR message by the HSTU-R, with each segment being acknowledged by an ACK(2) message. A first segment is implicitly numbered 0, a second segment is implicitly numbered 1, and so on. A third segment of the CLR message transmitted by the HSTU-R is not received by the HSTU-C free of any errors. Accordingly, the HSTU-C prepares an RTX message with the LCRM set to CLR. Since the CLR message is a multi-segment message, the MSFN field is encoded with 1 (e.g., CLR$_1$) to indicate that the second segment of the multi-segment message was the last segment correctly received. When the HSTU-R receives the RTX message, it determines that the second segment (e.g., CLR$_1$) was received error free but the third segment (e.g., CLR$_2$) was not received. Thus, the HSTU-R retransmits the third segment (e.g., CLR$_2$) of the CLR multi-segmented message. Although not shown in FIG. 4, the transaction then continues using standard transaction rules.

FIG. 5 illustrates the example in which the HSTU-R does not receive the first message sent by the HSTU-C. The transaction begins with the HSTU-C successfully receiving the CLR message transmitted by the HSTU-R. Then, the HSTU-C transmits a CL message to the HSTU-R. However, the CL message is not received by the HSTU-R free of errors. Since there is no last correctly received message from the HSTU-C, the HSTU-R prepares a RTX message with the LCRM field set to the code of NULL. When the HSTU-C receives the RTX message, it determines that no message was correctly received. Thus, the HSTU-C retransmits the first message (e.g., the CL message). Although not shown in FIG. 5, the transaction then continues using standard transaction rules.

In the example illustrated in FIG. 6, the communication channel initially is not error free. The HSTU-R transmits a CLR message to the HSTU-C, but it is not received error free by the HSTU-C. The HSTU-C informs the HSTU-R of this error by transmitting a RTX message with the LCRM set to NULL. However, due to, for example, problems with the communication channel, this message also is not error free. As a result, the RTX message is not correctly received by the HSTU-R. Thus, the HSTU-R prepares its own RTX message with the LCRM set to NULL, which indicates that the HSTU-R has not received any error free messages from the HSTU-C. In this example, the channel conditions have now improved, and the RTX message is received by the HSTU-C error free. Since the RTX message has a LCRM message of NULL, the HSTU-C determines that its RTX message (e.g., the first RTX(NULL) shown in FIG. 6), indicating that it had not received an error free message from the HTSU-R, was also not received error free. Accordingly, the HSTU-C terminates the session by sending a NAK-CD message to the HSTU-R.

Figure 7:
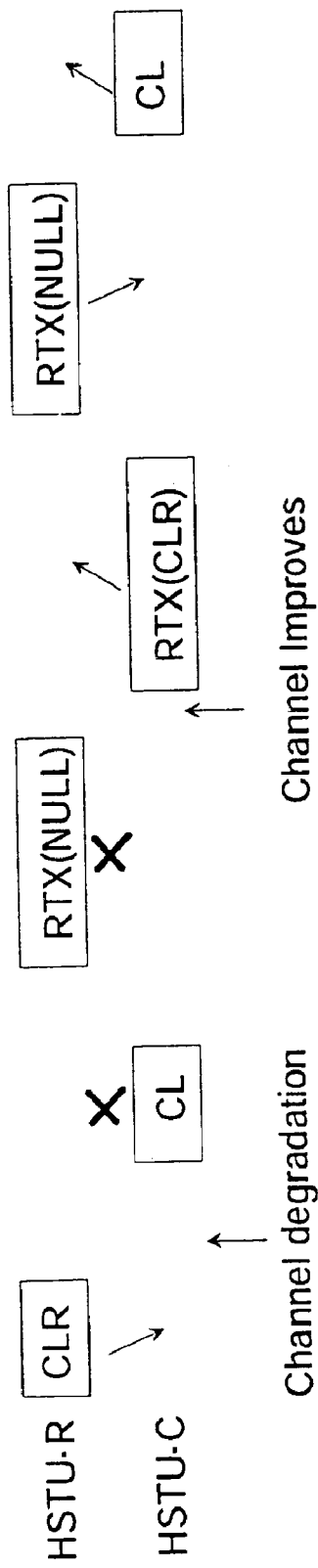
FIG. 7 illustrates an example transaction in which two errors occur in the middle of the transaction.

FIG. 7 illustrates an example in which the quality of a communication channel deteriorates (resulting in the reception of two errored messages) during a transaction, and then, the quality of the communication channel improves, so as to allow a subsequent error free message reception during the handshaking session. The HSTU-C successfully receives the CLR message that was transmitted by the HSTU-R. Although the HSTU-C sends an CL message to the HSTU-R, the HSTU-R does not receive the message error free. Since there is no last correctly received message from the HSTU-C, the HSTU-R prepares an RTX message in which the LCRM field is set to NULL. Since the channel degradation problem continues, the HSTU-C again fails to receive an error free message. Thus, the HSTU-C prepares and transmits a RTX message with the LCRM field set to CLR. Since the quality of the communication channel has improved at this point, the HSTU-R receives the RTX message, determines that its RTX(NULL) message was not received error free, and retransmits the RTX message with the LCRM field set to NULL. The HSTU-C receives the RTX message, determines that its CL message was not received error free, and retransmits the CL message. Although not shown in FIG. 7, the transaction then continues using the standard transaction rules.

Figure 8:
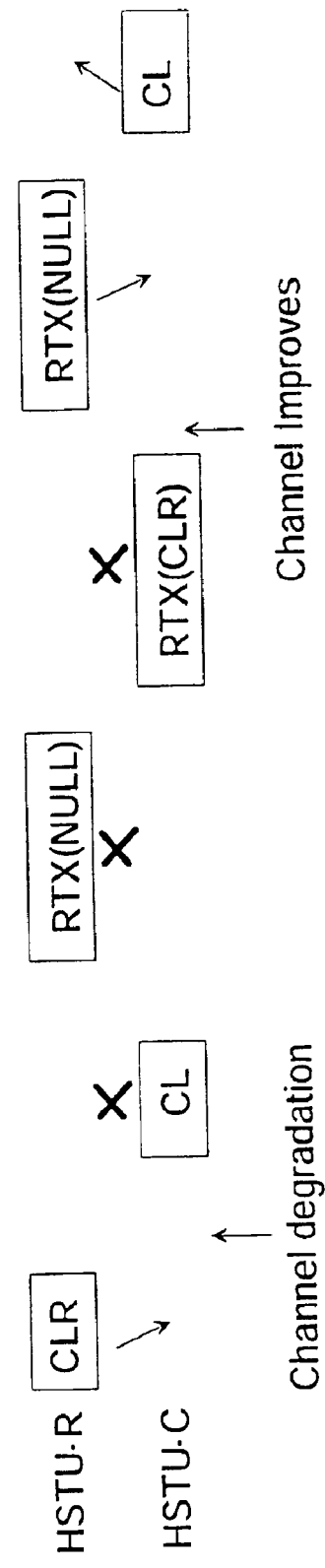
FIG. 8 illustrates an example transaction in which three errors occur in the middle of the transaction.

FIG. 8 illustrates an example transaction in which the quality of a communication channel deteriorates (resulting in the reception of three errored messages) during the transaction, and then, the quality of the communication channel improves, so as to allow a subsequent error free message reception during the handshaking session. The HSTU-C successfully receives the CLR message that was transmitted by the HSTU-R. Although the HSTU-C sends an CL message to the HSTU-R, the HSTU-R does not receive the message error free. Since there is no last correctly received message from the HSTU-C, the HSTU-R prepares an RTX message in which the LCRM field is set to NULL. however, because the channel degradation problem continues, the HSTU-C again fails to receive an error free message. Thus, the HSTU-C prepares and transmits a RTX message with the LCRM field set to CLR. Since the channel degradation problem continues, the HSTU-R again fails to receive an error free message. Again, the HSTU-R prepares an RTX message in which the LCRM field is set to NULL, since it has never received an error free message from the HSTU-C. At this point, the quality of the communication channel has improved, and the HSTU-C receives the RTX message transmitted from the HSTU-R, determines that its first CL message was not received error free, and retransmits the CL message. Although not shown in FIG. 8, the transaction then continues using standard transaction rules.

Figure 9:
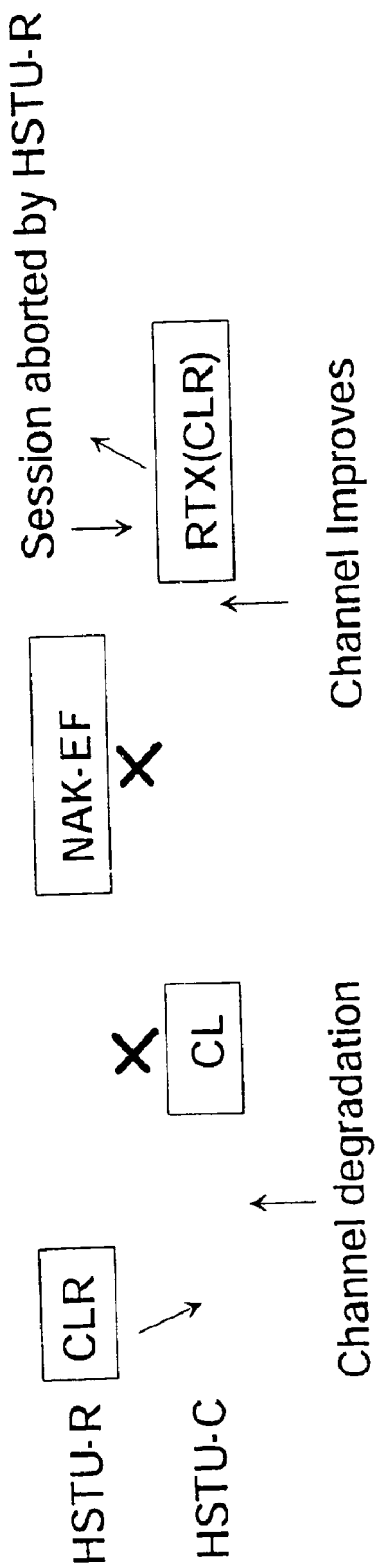
FIG. 9 illustrates an example transaction in which a HSTU-C that employs the present invention interacts with a HSTU-R that does not employ the present invention.

FIG. 9 illustrates an example transaction of a HSTU-C utilizing the present invention that interacts with a HSTU-R that does utilize the present invention. The HSTU-C successfully receives the CLR message that was transmitted by the HSTU-R. At this point, the quality of the communication channel deteriorates, and a CL message sent by the HSTU-C to the HSTU-R is not received error free by the HSTU-R. Since the HSTU-R does not employ (utilize) the present invention, prior art techniques are employed. Specifically, the HSTU-R prepares and transmits a NAK-EF (errored frame) message followed by a termination of the communication session. Since the channel degradation problem continues, the HSTU-C again fails to receive an error free message. The HSTU-C (which, as noted above, utilizes the present invention) prepares and transmits a RTX message with the LCRM field set to CLR. When the HSTU-C fails to receive a response from the HSTU-R, the HSTU-C terminates after a timeout period lapses.

Figure 10:
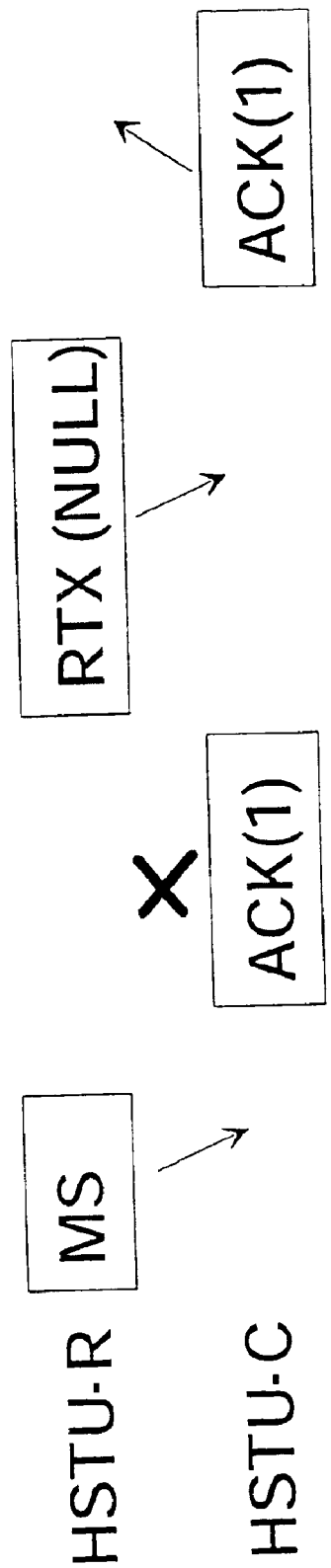
FIG. 10 illustrates an example transaction in which an ACK message is not received error free.

FIG. 10 illustrates an example transaction in which an ACK message is received with errors. The HSTU-C successfully receives an MS message that was transmitted by the HSTU-R. However, although the HSTU-C sends an ACK message to the HSTU-R, the HSTU-R does not receive the message error free. Since there is no last correctly received message from the HSTU-C, the HSTU-R responds by preparing an RTX message, in which the LCRM field is set to NULL. Since the HSTU-C determines that no message has been correctly received, the HSTU-C retransmits the ACK message, completing the transaction.

Figure 11:
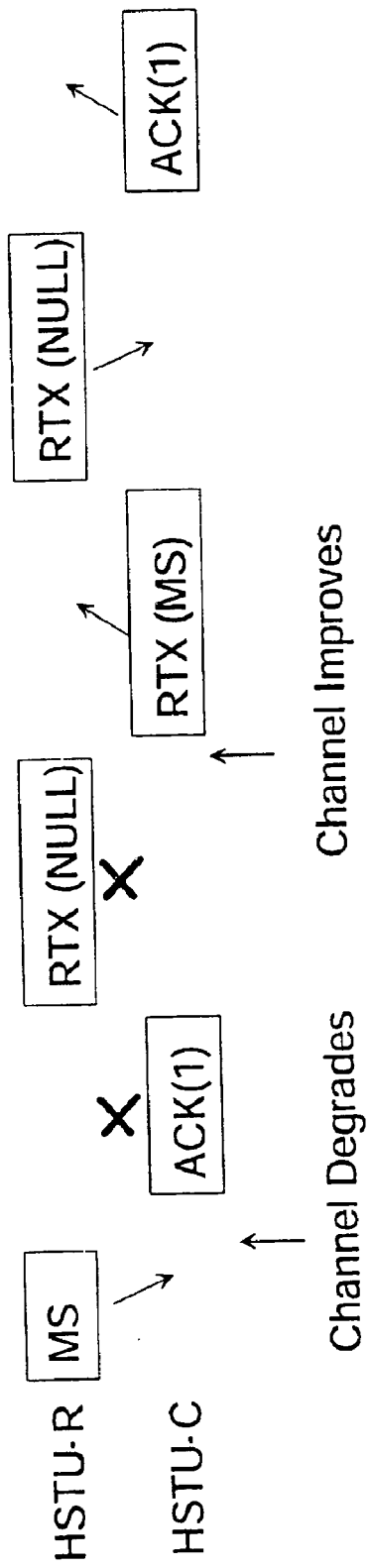
FIG. 11 illustrates an example transaction in which two errors occur in the middle of the transaction with an ACK as one of the errored messages.

FIG. 11 illustrates an example transaction in which two errors occur in the middle of the transaction, with an ACK being one of the errored messages. The HSTU-C successfully receives the MS message that was transmitted by the HSTU-R. The HSTU-C then sends an ACK message to the HSTU-R, however, due to a deterioration in the quality of the communication channel, the HSTU-R does not receive the message error free. Since there is no last correctly received message from the HSTU-C, the HSTU-R prepares an RTX message in which the LCRM field is set to NULL. Since the channel degradation problem continues, the HSTU-C again fails to receive an error free message. Thus, the HSTU-C prepares and transmits a RTX message with the LCRM field set to MS. Since the quality of the communication channel has improved at this point, the HSTU-R receives the RTX message, determines that its RTX(NULL) message was not received error free, and retransmits the RTX message with the LCRM field set to NULL. The HSTU-C receives the RTX message, determines that its ACK message was not received error free, and retransmits the ACK message. The transaction is then complete.

Figure 12:
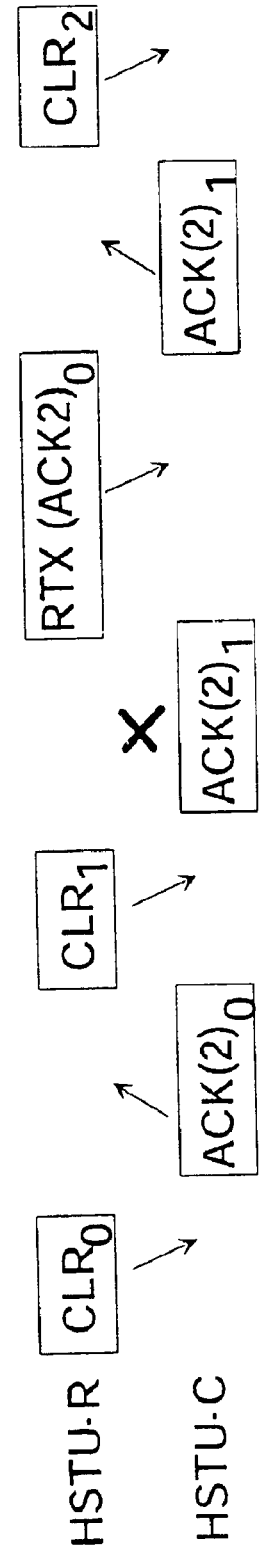
FIG. 12 illustrates an example transaction where an ACK for a multi-segmented message is received in error.

FIG. 12 illustrates an example transaction where an ACK(2) for a multi-segmented message is received in error. A multi-segment CLR message is transmitted by the HSTU-R, with each segment to be acknowledged by an ACK(2) message. A first segment is implicitly numbered 0, a second segment is implicitly numbered 1, and so on. A second ACK(2) sent by the HSTU-C is not received error free by the HSTU-R. Accordingly, the HSTU-R prepares an RTX message with the LCRM set to ACK(2). Since the ACK(2) message is an acknowledgment to a multi-segment message, the MSFN field is encoded with 0 (e.g., ACK(2)$_0$) to indicate that the first ACK(2) of the multi-segment message was the last segment correctly received. When the HSTU-C receives the RTX message, it determines that the first segment (e.g., ACK(2)$_0$) was received error free but the second ACK(2) (e.g., ACK(2)$_1$) was not received. Thus, the HSTU-C retransmits the second ACK(2) (e.g., ACK(2)$_1$). The HSTU-R then continues the transaction by transmitting the third segment of the CLR message (e.g. CLR$_2$). Although not shown in FIG. 12, the transaction then continues using standard transaction rules.

The foregoing discussion has been provided merely for the purpose of explanation and is in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims. For example, while the present invention has been described with respect to the xDSL procedure defined in ITU-T Recommendation G.994.1, the present invention is not limited to being used with this procedure, but is equally applicable with other procedures, such as, for example, ITU-T Recommendations V.8 and V.8bis. The methods described herein comprise dedicated hardware implementations including, but not limited to, application specific integrated circuits, programmable logic arrays and other hardware devices constructed to implement the methods described herein. However, it is understood that the invention may be implemented in software (e.g., a software modem) that is executed by a computer. Furthermore, alternative software implementations including, but not limited to, distributed processing or component/object distributed processing, parallel processing, or virtual machine processing can also be constructed to implement the methods described herein. In addition, although the present specification describes components and functions implemented in the embodiments with reference to particular standards and protocols, the invention is not limited to such standards and protocols. The standards for Internet and other packet-switched network transmission (e.g., TCP/IP, UDP/IP, HTML, SHTML, DHTML, XML, PPP, FTP, SMTP, MIME); peripheral control (IrDA; RS232C; USB; ISA; ExCA; PCMCIA); and public telephone networks (ISDN, ATM, xDSL) represent examples of the state of the art. Such standards are periodically superseded by faster or more efficient equivalents having essentially the same functions. Replacement standards and protocols having the same functions are considered equivalents.

What is claimed is:

1. A communication apparatus that minimizes a retransmission of messages when an error message is received during a communication handshaking procedure, comprising:
   a receiver that receives messages from a central communication apparatus, said receiver detecting an error message during the communication handshaking procedure; and
   a retransmission requester that transmits a retransmission request message to the central communication apparatus when said receiver detects the error message.

2. The communication apparatus of claim 1, wherein said retransmission request message includes a last correctly received message.

3. The communication of claim 2, wherein a retransmission commences with a message immediately after said last correctly received message.

4. The communication apparatus of claim 2, wherein said retransmission requester transmits a null message code to the central communication apparatus instead of said last correctly received message when said receiver does not receive an error free message during the communication handshaking procedure.

5. The communication apparatus of claim 1, wherein said retransmission request message includes information related to a suggested length of a subsequent message frame to be transmitted to the communication apparatus.

6. The communication apparatus of claim 1, wherein said retransmission request message includes information related to a frame number of a multi-segmented message.

7. A central communication apparatus that minimizes a retransmission of messages when an error message is received during a communication handshaking procedure, comprising:
   a receiver that receives messages from a remote communication terminal, said receiver detecting an error message during the communication handshaking procedure; and
   a retransmission requester that transmits a retransmission request message to the remote communication terminal when said receiver detects the error message.

8. The central communication apparatus of claim 7, wherein said retransmission request message includes a last correctly received message.

9. The central communication apparatus of claim 8, wherein a retransmission commences with a message immediately after the last correctly received message.

10. The central communication apparatus of claim 8, wherein said retransmission requester transmits a null message code to the remote communication terminal instead of the last correctly received message when said receiver does not receive an error free message during the communication handshaking procedure.

11. The central communication apparatus of claim 7, wherein said retransmission request message includes information related to a suggested length of a subsequent message frame to be transmitted to the central communication apparatus.

12. The central communication apparatus of claim 7, wherein said retransmission request message includes information related to a frame number of a multi-segmented message.

13. A method for minimizing a retransmission of messages when an error message is received during a communication handshaking procedure, comprising:
   receiving messages from a central communication apparatus;
   detecting an error message during the communication handshaking procedure; and
   transmitting a retransmission request message to the central communication apparatus when the error message is detected.

14. The method of claim 13, wherein the retransmission request message includes a last correctly received message.

15. The method of claim 14, wherein a retransmission commences with a message starting immediately after the last correctly received message.

16. The method of claim 14, further comprising transmitting a null message code to the central communication apparatus instead of the last correctly received message when an error free message is not received during the communication handshaking procedure.

17. The method of claim 13, wherein the retransmission request message includes information related to a suggested length of a subsequent message frame to be transmitted.

18. The method of claim 13, wherein the retransmission request message includes information related to a frame number of a multi-segmented message.

19. A method for minimizing a retransmission of messages when an error message is received during a communication handshaking procedure, comprising:

receiving messages from a remote communication terminal;

detecting an error message during the communication handshaking procedure; and transmitting a retransmission request message to the remote communication terminal when the error message is detected.

20. The method of claim 19, wherein the retransmission request message includes a last correctly received message.

21. The method of claim 20, wherein a retransmission commences with a message immediately after the last correctly received message.

22. The method of claim 20, further comprising transmitting a null message code instead of the last correctly received message when an error free message is not received during the communication handshaking procedure.

23. The method of claim 19, wherein the retransmission request message includes information related to a suggested length of a subsequent message frame to be transmitted.

24. The method of claim 19, wherein the retransmission request message includes information related to a frame number of a multi-segmented message.

25. A method for minimizing a retransmission of messages between a plurality of communication apparatuses when an error message is received during a communication handshaking procedure, comprising:

detecting whether a message received during a communication handshaking procedure includes an error message; and transmitting a retransmission request message to a communication apparatus, of the plurality of communication apparatuses, that transmitted the error message when the error message is detected.

26. The method of claim 25, wherein the retransmission request message includes a last correctly received message.

27. The method of claim 26, wherein a retransmission commences with a message that starts immediately after the last correctly received message.

28. The method of claim 26, further comprising transmitting a null message code instead of the last correctly received message when an error free message is not received during the communication handshaking procedure.

29. The method of claim 25, wherein the retransmission request message includes information related to a suggested length of a subsequent message frame to be transmitted.

30. The method of claim 25, wherein the retransmission request message includes information related to a frame number of a multi-segmented message.

* * * * *